(No Model.)
T. ROBINSON.
Potato Bug Catcher.
No. 236,631.  Patented Jan. 11, 1881.
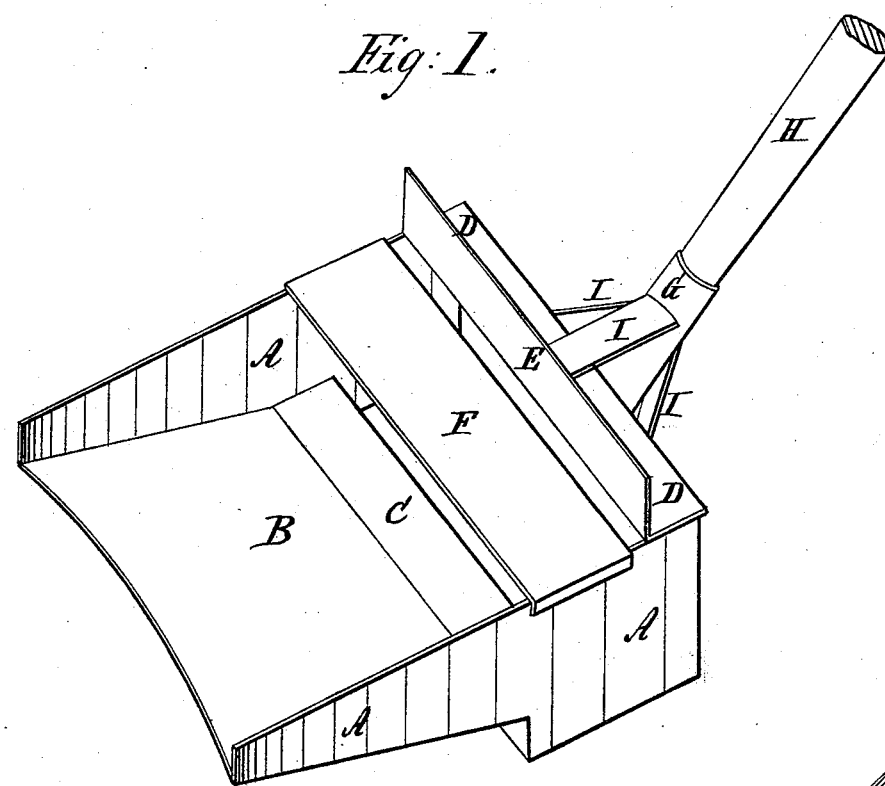
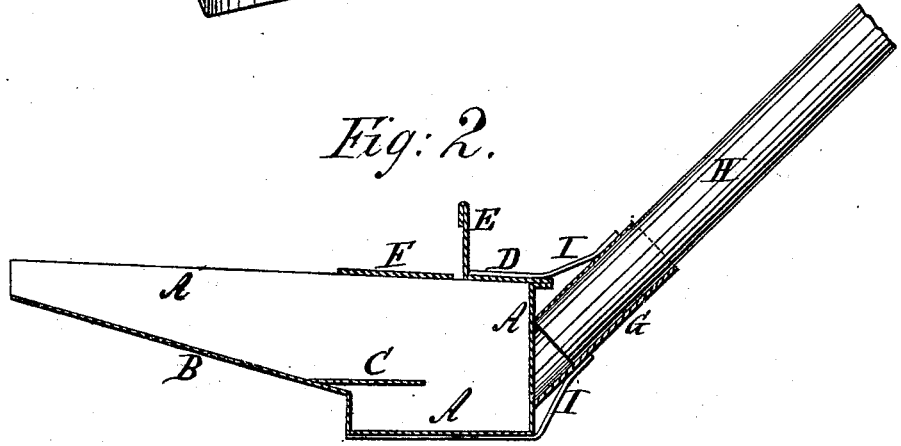
WITNESSES:
A. Schehl.
C. Sedgwick.
INVENTOR:
T. Robinson
BY Munn & Co.
ATTORNEYS.

UNITED STATES PATENT OFFICE.

THOMAS ROBINSON, OF NEWTONVILLE, INDIANA.

POTATO-BUG CATCHER.

SPECIFICATION forming part of Letters Patent No. 236,631, dated January 11, 1881.

Application filed September 10, 1880. (No model.)

*To all whom it may concern:*

Be it known that I, THOMAS ROBINSON, of Newtonville, in the county of Spencer and State of Indiana, have invented a new and useful Improvement in Potato-Bug Catchers, of which the following is a specification.

Figure 1 is a perspective view of the improvement. Fig. 2 is a sectional side elevation.

Similar letters of reference indicate corresponding parts.

The object of this invention is to furnish a simple catching-instrument, so constructed that insects can be conveniently caught and removed from potato-vines and other plants.

The invention consists of a box having an inclined apron and extended sides to receive the bugs, guard-plates to prevent the bugs from shaking out, guard-plates to intercept flying bugs, and a socket and handle for carrying the catcher, as will be hereinafter fully described.

A is a rectangular box the forward side of which is made low, and has an inclined apron, B, connected with its upper edge. The sides of the box A are extended forward, and are connected with the side edges of the apron B, to prevent the bugs from sliding off the said apron at its side edges.

To the lower part of the inclined apron B and to the sides of the box A is attached a plate, C, which projects back two inches, more or less, into the box B, and parallel with its bottom, or nearly so, to prevent the bugs that may have been received into the box A from being shaken out should the catcher strike an obstruction. For the same purpose a plate, D, two inches, more or less, in width, is attached to the rear part of the upper edge of the box A.

To the forward edge of the top plate, D, is attached, or upon it is formed, an upwardly-projecting plate, E, two inches, more or less, in width, to intercept such insects or bugs as may rise from the vines or plants and attempt to fly away, and cause them to fall into the box A.

When the catcher is to be used for catching flying bugs, a plate, F, with turned-down end edges to keep it in place, is slipped upon the upper edges of the sides of the box A, in front of the upright plate E, as shown in the drawings, to prevent the bugs from rising out of the box A after they have once entered it.

When the catcher is used for catching the ordinary potato-bug the plate F is not used.

The forward edge of the apron B is concaved to better adapt it to take the bugs from the vines.

To the rear side of the box A is attached a socket, G, to receive a handle, H, and which is strengthened in place by braces I, attached to it and to the said box A. The socket G projects at an angle of about forty-five degrees (45°) with the box A.

The handle H may be made of any convenient length and size.

In using the catcher it is carried with the hand in such a position that the forward edge of the apron B may strike the vines and cause the bugs to fall upon the said apron and slide down it into the box A, whence they can be poured out and destroyed.

Having thus described my invention, what I claim as new, and desire to secure by Letters Patent, is—

1. A potato-bug catcher constructed substantially as herein shown and described, consisting of the box A, having inclined apron B and extended sides, the guard-plate C, attached to the lower part of the apron B and projecting over the bottom of the box A, the top guard-plate, D, the projecting plate E, and the socket and handle G H, as set forth.

2. In a potato-bug catcher, the combination, with the box A, having inclined apron B and extended sides, of the guard-plate C, projecting over the lower forward part of the box A, the guard-plate D, attached to the rear part of the upper edge of the box and having an upwardly-projecting plate, E, at its forward edge, and the socket and handle G H, substantially as herein shown and described, whereby the bugs are knocked from the vines and caught, as set forth.

3. In a potato-bug catcher, the combination, with the box A, having inclined apron B, guard-plates C D E, and socket and handle G H, of the detachable guard-plate F, substantially as herein shown and described, whereby flying bugs are kept from rising out of the box A, as set forth.

THOMAS ROBINSON.

Witnesses:
D. M. HAMMOND,
WM. CADICK.